US007262693B2

(12) United States Patent
Karschnia et al.

(10) Patent No.: US 7,262,693 B2
(45) Date of Patent: Aug. 28, 2007

(54) PROCESS FIELD DEVICE WITH RADIO FREQUENCY COMMUNICATION

(75) Inventors: Robert J. Karschnia, Chaska, MN (US); Charles R. Willcox, Eden Prairie, MN (US); David A. Broden, Andover, MN (US); Brian L. Westfield, Victoria, MN (US); Kelly M. Orth, Apple Valley, MN (US)

(73) Assignee: Rosemount Inc., Eden Prairie, MN (US)

( * ) Notice: Subject to any disclaimer, the term of this patent is extended or adjusted under 35 U.S.C. 154(b) by 187 days.

(21) Appl. No.: 10/878,235

(22) Filed: Jun. 28, 2004

(65) Prior Publication Data

US 2005/0289276 A1 Dec. 29, 2005

(51) Int. Cl.
*G08B 29/00* (2006.01)

(52) U.S. Cl. ................. 340/508; 340/539.1; 340/693.1

(58) Field of Classification Search ............. 340/693.1
See application file for complete search history.

(56) References Cited

U.S. PATENT DOCUMENTS

| | | | | |
|---|---|---|---|---|
| 2,533,339 | A | 12/1950 | Willenborg | 177/311 |
| 3,012,432 | A | 12/1961 | Moore et al. | 73/40 |
| 3,218,863 | A | 11/1965 | Calvert | 73/398 |
| 3,232,712 | A | 2/1966 | Stearns | 23/255 |
| 3,249,833 | A | 5/1966 | Vosteen | 317/246 |
| 3,374,112 | A | 3/1968 | Danon | 117/226 |
| 3,557,621 | A | 1/1971 | Ferran | 73/398 |
| 3,697,835 | A | 10/1972 | Satori | 317/246 |
| 3,808,480 | A | 4/1974 | Johnston | 317/256 |
| 3,924,219 | A | 12/1975 | Braun | 338/34 |
| 4,008,619 | A | 2/1977 | Alcaide et al. | 73/398 |
| 4,158,217 | A | 6/1979 | Bell | 361/283 |
| 4,168,518 | A | 9/1979 | Lee | 361/283 |
| 4,177,496 | A | 12/1979 | Bell et al. | 361/283 |
| 4,227,419 | A | 10/1980 | Park | 73/724 |
| 4,287,553 | A | 9/1981 | Braunlich | 361/283 |
| 4,322,775 | A | 3/1982 | Delatorre | 361/283 |
| 4,336,567 | A | 6/1982 | Anastasia | 361/283 |
| 4,358,814 | A | 11/1982 | Lee et al. | 361/283 |

(Continued)

FOREIGN PATENT DOCUMENTS

| | | | |
|---|---|---|---|
| DE | 3340834 | A1 | 5/1985 |
| DE | 101 04 582 | A1 | 10/2001 |
| EP | 0 524 550 | A1 | 1/1993 |
| EP | 1 202 145 | A1 | 5/2002 |
| EP | 1 293 853 | A1 | 3/2003 |

(Continued)

OTHER PUBLICATIONS

Notification of Transmittal of the International Search Report or the Declaration- PCT/US03/10403.

(Continued)

*Primary Examiner*—Benjamin C. Lee
*Assistant Examiner*—George A. Bugg
(74) *Attorney, Agent, or Firm*—Westman, Champlin & Kelly, P.A.

(57) ABSTRACT

A field device for use in an industrial process control or monitoring system includes terminals configured to connect to a two-wire process control loop. The loop carries data and provides power to the field device. RF circuitry in the field device is provided for radio frequency communication. A power supply powers the RF circuitry using power received from the two-wire process control loop.

24 Claims, 6 Drawing Sheets

U.S. PATENT DOCUMENTS

| | | | | |
|---|---|---|---|---|
| 4,370,890 | A | 2/1983 | Frick | 73/718 |
| 4,389,895 | A | 6/1983 | Rud, Jr. | 73/724 |
| 4,422,125 | A | 12/1983 | Antonazzi et al. | 361/283 |
| 4,422,335 | A | 12/1983 | Ohnesorge et al. | 73/724 |
| 4,434,451 | A | 2/1984 | Delatorre | 361/283 |
| 4,455,874 | A | 6/1984 | Paros | 73/704 |
| 4,458,537 | A | 7/1984 | Bell et al. | 73/718 |
| 4,490,773 | A | 12/1984 | Moffatt | 361/283 |
| 4,542,436 | A | 9/1985 | Carusillo | 361/283 |
| 4,562,742 | A | 1/1986 | Bell | 73/718 |
| 4,590,466 | A | 5/1986 | Wiklund et al. | 340/870.28 |
| 4,670,733 | A | 6/1987 | Bell | 338/36 |
| 4,704,607 | A | 11/1987 | Teather et al. | 340/825.07 |
| 4,749,993 | A | 6/1988 | Szabo et al. | 340/870.31 |
| 4,785,669 | A | 11/1988 | Benson et al. | 73/718 |
| 4,860,232 | A | 8/1989 | Lee et al. | 364/571.04 |
| 4,875,369 | A | 10/1989 | Delatorre | 73/151 |
| 4,878,012 | A | 10/1989 | Schulte et al. | 324/60 |
| 4,926,674 | A | 5/1990 | Fossum et al. | 73/4 |
| 4,951,174 | A | 8/1990 | Grantham et al. | 361/283.1 |
| 4,977,480 | A | 12/1990 | Nishihara | 73/724 |
| 5,094,109 | A | 3/1992 | Dean et al. | 73/718 |
| 5,168,419 | A | 12/1992 | Delatorre | 361/283 |
| 5,194,819 | A | 3/1993 | Briefer | 73/718 |
| 5,230,250 | A | 7/1993 | Delatorre | 73/733 |
| 5,233,875 | A | 8/1993 | Obermeier et al. | 73/718 |
| 5,329,818 | A | 7/1994 | Frick et al. | 73/708 |
| 5,492,016 | A | 2/1996 | Pinto et al. | 73/724 |
| 5,542,300 | A | 8/1996 | Lee | 73/724 |
| 5,606,513 | A | 2/1997 | Louwagie et al. | 702/138 |
| 5,610,552 | A | 3/1997 | Schlesinger et al. | 327/560 |
| 5,637,802 | A | 6/1997 | Frick et al. | 73/724 |
| 5,642,301 | A | 6/1997 | Warrior et al. | 364/571.02 |
| 5,656,782 | A | 8/1997 | Powell, II et al. | 73/756 |
| 5,665,899 | A | 9/1997 | Willcox | 731/1.63 |
| 5,682,476 | A * | 10/1997 | Tapperson et al. | 370/225 |
| 5,705,978 | A | 1/1998 | Frick et al. | 340/511 |
| 5,757,608 | A | 5/1998 | Bernot et al. | 361/283.4 |
| 5,793,963 | A * | 8/1998 | Tapperson et al. | 709/201 |
| 5,851,083 | A | 12/1998 | Palan | 403/337 |
| 5,870,695 | A | 2/1999 | Brown et al. | 702/138 |
| 5,872,494 | A | 2/1999 | Palan et al. | 333/252 |
| 5,899,962 | A | 5/1999 | Louwagie et al. | 702/138 |
| 5,911,162 | A | 6/1999 | Denner | 73/718 |
| 5,954,526 | A | 9/1999 | Smith | 439/136 |
| 5,978,658 | A | 11/1999 | Shoji | 455/66 |
| 5,992,240 | A | 11/1999 | Tsuruoka et al. | 73/718 |
| 6,038,927 | A | 3/2000 | Karas | 73/706 |
| 6,236,096 | B1 | 5/2001 | Chang et al. | 257/419 |
| 6,236,334 | B1 * | 5/2001 | Tapperson et al. | 340/825.37 |
| 6,295,875 | B1 | 10/2001 | Frick et al. | 73/718 |
| 6,338,283 | B1 | 1/2002 | Blazquez Navarro et al. | 73/865.8 |
| 6,508,131 | B2 | 1/2003 | Frick | 73/756 |
| 6,574,515 | B1 * | 6/2003 | Kirkpatrick et al. | 700/19 |
| 6,711,446 | B2 * | 3/2004 | Kirkpatrick et al. | 700/19 |
| 6,839,546 | B2 | 1/2005 | Hedtke | 455/67.11 |
| 7,010,294 | B1 * | 3/2006 | Pyotsia et al. | 455/420 |
| 7,088,285 | B2 * | 8/2006 | Smith | 342/124 |
| 2002/0011115 | A1 | 1/2002 | Frick | 73/718 |
| 2002/0065631 | A1 | 5/2002 | Loechner | 702/188 |
| 2003/0171827 | A1 | 9/2003 | Keyes, IV et al. | 700/19 |
| 2004/0199681 | A1 * | 10/2004 | Hedtke | 710/37 |
| 2005/0109395 | A1 * | 5/2005 | Seberger | 137/8 |
| 2005/0201349 | A1 | 9/2005 | Budampati | 370/342 |
| 2005/0228509 | A1 * | 10/2005 | James | 700/19 |
| 2005/0245291 | A1 * | 11/2005 | Brown et al. | 455/572 |
| 2005/0281215 | A1 | 12/2005 | Budampati et al. | 370/328 |
| 2006/0002368 | A1 | 1/2006 | Budampati et al. | 370/351 |
| 2006/0227729 | A1 | 10/2006 | Budampati et al. | 370/278 |
| 2006/0274644 | A1 | 12/2006 | Budampati et al. | 370/216 |
| 2006/0274671 | A1 | 12/2006 | Budampati et al. | 370/254 |
| 2006/0287001 | A1 | 12/2006 | Budampati et al. | 455/552.1 |
| 2006/0290328 | A1 | 12/2006 | Orth | 323/218 |
| 2007/0030816 | A1 | 2/2007 | Kolavennu | 370/252 |
| 2007/0030832 | A1 | 2/2007 | Gonia et al. | 370/338 |

FOREIGN PATENT DOCUMENTS

| | | |
|---|---|---|
| JP | 02067794 | 7/1990 |
| WO | WO95/07522 | 3/1995 |
| WO | WO99/53286 | 10/1999 |
| WO | WO 03/023536 | 3/2003 |
| WO | WO 03/089881 | 10/2003 |

OTHER PUBLICATIONS

"Wireless R&D Aims to Boost Traffic", by M. Moore, *InTech with Industrial Computing*, Feb. 2002, 3 pgs.

"System Checks Faraway Machines' Health", by J. Strothman, *InTech with Industrial Computing*, Feb. 2002, 1 pg.

"Wireless Management Toolkit XYR 5000", by Honeywell International Inc., Phoenix, Arizona, 3 pgs., Oct. 2003.

"Wireless Analog Input Transmitters XYR 5000", by Honeywell International Inc., Phoenix, Arizona, 4 pgs., Oct. 2003.

"Quad Analog Output Module Installation and User's Manual", by Honeywell International Inc., Phoenix, Arizona, pp. Ii, iii, iv and 1-12, Dec. 2003.

"Wireless Dual Analog Input Interface Transmitter Installation and User's Manual", by Honeywell International Inc., Phoenix, Arizona, pp. Ii-vi and 7-43, Dec. 2003.

"XYR 5000 Wireless Dual Analog Input Interface, Model Selection Guide", by Honeywell International Inc., Phoenix, Arizona.

"Wireless Measure, Monitor & Control", by Accutech, 4 pgs. May 2003.

"Wireless Instrumentation, Multi-Input Field Unit", by Accutech, 2 pgs., Dec. 2003.

"Quad Analog Output Module", by Accutech, 1 pg. Dec. 2003.

3 Pages from Website www.chemicalprocessing.com, Apr. 2004.

4 Pages from Website http://content.honeywell.com/imc/eznews/eznews0403/news.htm,. 2004.

Notification of Transmittal of the International Search Report and the Written Opinion—PCT/US2005/021757.

* cited by examiner

PROCESS FIELD DEVICE WITH RADIO FREQUENCY COMMUNICATION

BACKGROUND OF THE INVENTION

The present invention relates to industrial process control or monitoring systems. More specifically, the present invention relates to field devices in such systems which are capable of Radio Frequency (RF) communication.

In industrial settings, control systems are used to monitor and control inventories of industrial and chemical processes, and the like. Typically, the control system performs these functions using field devices distributed at key locations in the industrial process and coupled to the control circuitry in the control room by a process control loop. The term "field device" refers to any device that performs a function in a distributed control or process monitoring system, including all devices currently known, or yet to be known, used in the measurement, control and monitoring of industrial processes.

Some field devices include a transducer. A transducer is understood to mean either a device that generates an output signal based on a physical input or that generates a physical output based on an input signal. Typically, a transducer transforms an input into an output having a different form. Types of transducers include various analytical equipment, pressure sensors, thermistors, thermocouples, strain gauges, flow transmitters, positioners, actuators, solenoids, indicator lights, and others.

Typically, each field device also includes communication circuitry that is used for communicating with a process control room, or other circuitry, over a process control loop. In some installations, the process control loop is also used to deliver a regulated current and/or voltage to the field device for powering the field device. The process control loop also carries data, either in an analog or digital format.

Traditionally, analog field devices have been connected to the control room by two-wire process control current loops, with each device connected to the control room by a single two-wire control loop. Typically, a voltage differential is maintained between the two wires within a range of voltages from 12-45 volts for analog mode and 9-50 volts for digital mode. Some analog field devices transmit a signal to the control room by modulating the current running through the current loop to a current proportional to the sensed process variable. Other analog field device can perform an action under the control of the control room by controlling the magnitude of the current through the loop. In addition to, or in the alternative, the process control loop can carry digital signals used for communication with field devices.

In some installations, wireless technologies have begun to be used to communicate with field devices. For example, completely wireless installations are used in which the field device uses a battery, solar cell, or other technique to obtain power without any sort of wired connection. However, the majority of field devices are hardwired to a process control room and do not use wireless communication techniques.

SUMMARY

A field device for use in an industrial process control or monitoring system includes terminals configured to connect to a two-wire process control loop configured to carry data and to provide power. RF circuitry in the field device is configured for radio frequency communication. In one embodiment, power supply circuitry powers the RF circuitry using power received completely from the two-wire process control loop. A method is also provided.

DETAILED DESCRIPTION

The present invention provides a field device configured to couple to a process control loop which further includes a wireless communication module for one way or bi-directional wireless communication. The wireless communication module can transmit and/or receive an RF signal from a remote device or location. The module can be directly powered with power received from the two-wire process control loop, or can be powered with power received from the process control loop and stored for subsequent use. The module can be a removable module in which the module need only couple to those field devices in which wireless communication is desired.

Figure 1:
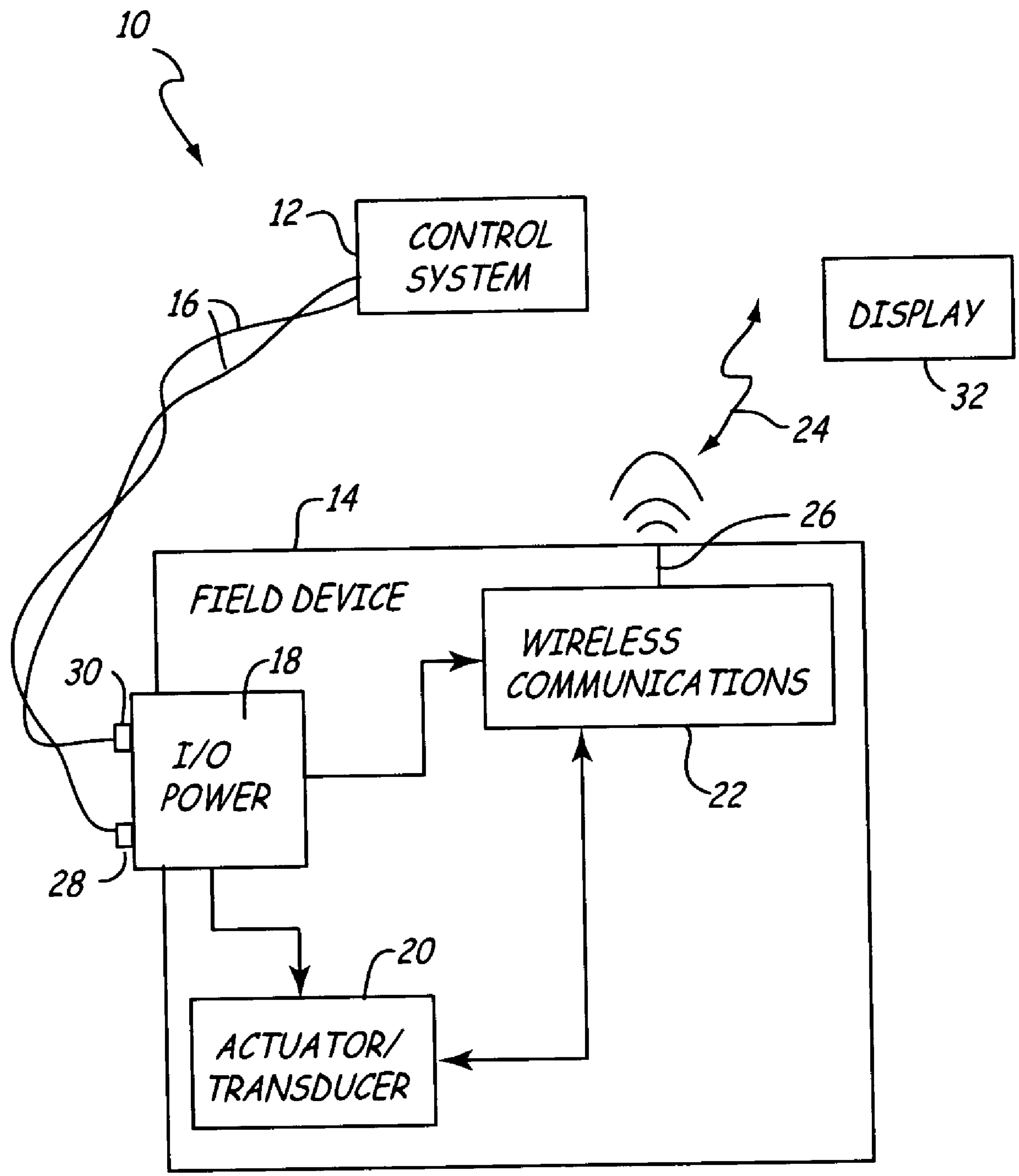
FIG. 1 is a simplified block diagram of a process control monitoring system including a field device configured for wireless communication.

FIG. 1 is a simplified block diagram of a process control or monitoring system 10 in which a control room or control system 12 couples to a field device 14 over a two-wire process control loop 16. The field device 14 includes I/O power circuitry 18, actuator/transducer 20 and wireless communication circuitry 22. The wireless communication circuitry 22 is configured to send and/or receive an RF signal 24 using an antenna 26.

Currently, industrial instrumentation often includes a local display or "meter" which can be used for local monitoring of process information. The meter can be quite useful in many installations, however, such a local display configuration does have several limitations. A local display requires direct visual access to the field device. Further, typically an operator can only view a single meter at a time. The instruments which contain the meter are often not at a convenient location or viewing angle. One technique which has been used to address such a configuration is the use of a meter which is wired to a process transmitter. This allows the meter to be mounted at a more convenient location. Another technique is shown and described in U.S. patent application Ser. No. 10/128,769, filed Apr. 22, 2002, entitled PROCESS TRANSMITTER WITH WIRELESS COMMUNICATION LINK.

Figure 2:
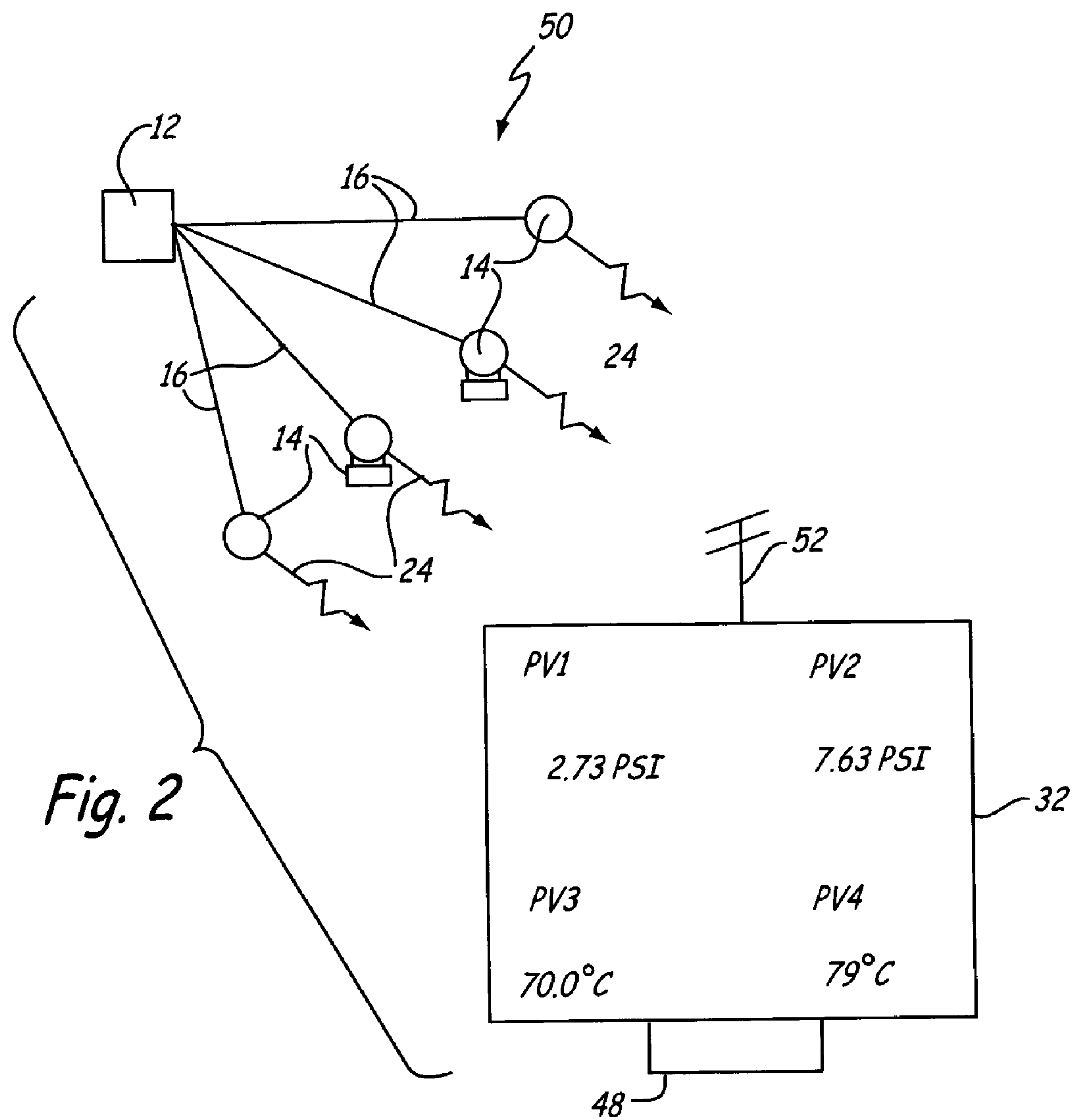
FIG. 2 is a block diagram of a process controller monitoring system in which multiple field devices transmit information to a remote meter.

With the present invention, an RF communication module is included in a field device which can be used in addition to the connection to a process control loop such as loop 16. The wireless communication module 22 can be configured to be compact and lower power such that it can be easily included in existing field device configurations. The module can be used for wireless transmission of information for use in monitoring control and/or display of data. Such a radio transmitter can make the field device information available in a local area. For example, a single local display such as display 32 can be provided and used to display information from the field device 14. The display 32 can be configured to display information from several devices, either simultaneously, sequentially, or through commands provided to the display, for example using a manual input such as buttons available to an operator. The display 32 can be placed at a fixed location or can be a portable device such that it can carry throughout the process control system to monitor and observe operation of various field devices. Depending on the strength of the RF signal 24 and the sensitivity of the transmit and receive circuitry, the area covered by the RF transmission can be controlled as desired. For example, FIG. 2 is a simplified diagram of a process control system 50 in which a number of field devices 14 are coupled to the control room 12 through individual process control loops 16. Each field device 14 transmits an RF signal 24 for receipt by display 32. In this example, display 32 is capable of displaying four process variables (PV1, PV2, PV3 and PV4) which are received from the field devices 14 using antenna 52. As mentioned above, the display 32 can be a fixed display or can be a portable display, such as a hand held unit. In this particular configuration, the display 32 is illustrated as showing two process variables which relate to process pressure and two process variables which relate to process temperature. This allows the field devices 14 to provide information over the RF connection within a desired range, for example, within a local area. For example, if the display 32 is within 40 meters of a field device 14, it will be capable of receiving an displaying information from that field device. An optional user input 48 can be used to, for example, select the format of the display, the process variable displayed, or used to interrogate a field device 14.

Figure 3:
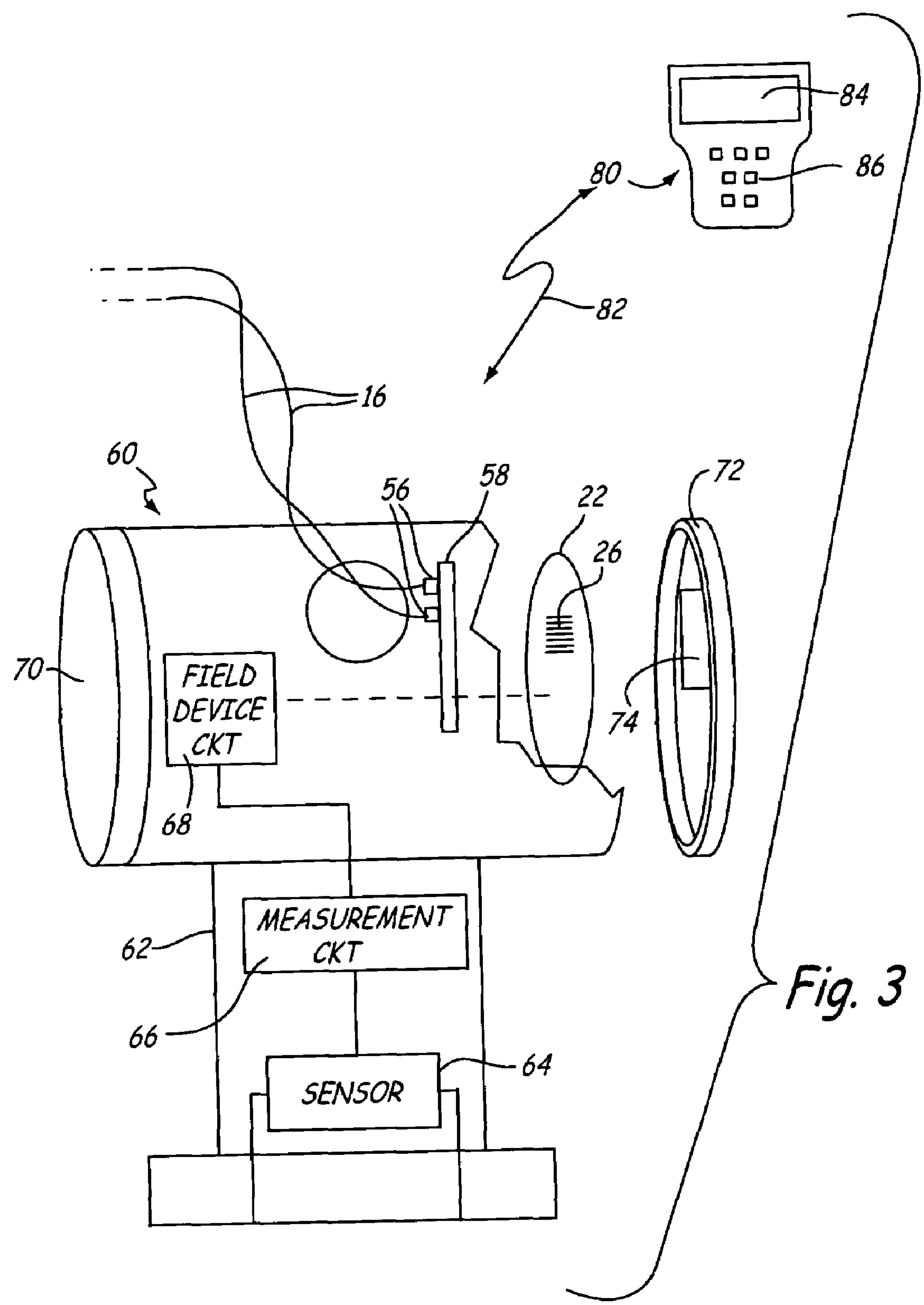
FIG. 3 is an exploded cut away view of a field device including wireless communication circuitry for communicating with a remote device such as a hand held unit.

FIG. 3 is a simplified cutaway partially exploded view of a pressure transmitter 60 which is one example of a field device. Pressure transmitter 60 couples to two-wire process control loop 16 and includes a transmitter housing 62. Process control loop 16 couples to terminals 56 carried on terminal board 58. A pressure sensor 64 provides one example of a transducer and is configured to couple to a process fitting to measure a differential pressure occurring in a process fluid. The output from the sensor 64 is provided to measurement circuitry 66 which couples to field device circuit 68. The field device circuit 68 implements aspects of the I/O power supply 18 shown in FIG. 1. The wireless communication circuitry 22 couples to field device circuit 68 and may, in some embodiments, couple to process control loop 16.

The housing 62 includes end caps 70 and 72 which can be screwed into the housing 62. End cap 72 includes an RF transparent window 74 configured to align generally with an antenna 26 carried on wireless communication circuit 22. When attached, the end caps provide a intrinsically safe enclosure for circuitry within transmitter 60. The materials typically used in end caps, for example metal, are not transparent to RF signals. However, RF transparent window 74 allows RF signals to be sent from or received by antenna 26. One example RF transparent material for use with window 74 is glass or the like. However, any appropriate material can be used. The window and housing configuration can help to meet intrinsic safety requirements and provide flame proof (explosion proof) capability. Further, the cavity within housing 62 can be configured to provide a desired radiation pattern of RF signals generated by antenna 26. For example, it may be desirable to have the RF transmission be directional in some implementations, or omnidirectional in others. In other implementations, the cover 62 can be lengthened to provide an additional interior cavity for placement of wireless communication circuit 22.

The wireless communication circuitry 22 can be selected as desired. One example circuit is the "I-Bean" transmitter device available from Millennial Net. However, other circuitry can be used. Analog or digital signals carried on process control loop 16 can be read and transmitted using the wireless communication circuit 22 without disrupting operation of the process control loop 16 or field device circuitry 68. The circuitry used for wireless transmission should be sufficiently small and low powered to fit within the physical and power constraints of process field devices. Some prior art transmitters are configured to receive an optional display arranged generally in the position shown for wireless communication circuit 22 in FIG. 3. In such a configuration, the wireless communication circuit 22 can be used in place of the local display. In such a configuration, the communication wireless circuitry 22 simply transmits an RF signal which couples directly to the process control loop 16 and transmits an RF signal which corresponds to any analog and/or digital signals carried on the loop 16.

In general, the process control loop discussed herein can comprise any type of process control loop for use in industrial process control and monitoring systems. Such loops include 4-20 mA current loops in which a analog current level is varied between 4 and 20 mA to transmit information. The same control loop can be used to provide power to the field device. Another type of process control loop is in accordance with the HART® communication protocol in which digital transmissions are superimposed on the 4-20 mA signal for transmission of additional information. Another example two-wire process control loop uses a protocol set forth by the Instrument Society of America (ISA) which is called the Field Bus SP50 protocol. However, end signaling protocol can be used. Some process control loops are configured to connect to multiple field devices such that the field devices can communication one another or monitor transmissions from another field device. In general, any type of information transmitted on such process control loops, or available or generated internally or received by a field device, or otherwise used to control a field device or other type of information, can be transmitted using the wireless communication techniques of the present invention. In another example, a hand held unit or device used to configure field devices can be carried into the field by an operator. The operator uses the hand held device to send or receive information to a field device when the hand held device is within proximity of the field device. This allows the operator to gather information or program a field device without having to physically couple to the device or the physical process control loop.

In some embodiments, it is also desirable for communications from a field device, or to a field device, to carry addressing information. The addressing information can be indicative of the source of the transmission or the intended recipient of the transmission. The wireless communication circuitry can transmit continuously or on a periodic or intermittent basis, as desired. In another example, the wireless communication circuitry only transmits when activated or "polled". The activation can be from a source internal to the field device, received through the process control loop, received from a wireless source, or received or generated by another source. In environments in which multiple field devices may transmit simultaneously, the transmission protocol should be selected to avoid or address any type of collisions which might interfere with the transmissions. For example, different frequencies or frequency skipping techniques can be used, random or semi-random transmission windows can be used, repeated transmissions or token based techniques can be implemented or other collision avoidance techniques as desired. If the transmission includes error detection or correction information, this information can be used to detect an error in the transmission and/or correct any errors in the transmissions. If an error is not correctable, the receiving unit can request a re-transmission of the corrupt data or, can indicate an error, or can wait for a subsequent transmission of the data, or take other steps as desired.

FIG. 3 also shows an example hand held device 80 for communication with circuitry 22 over RF connection 82. Hand held device 80 includes a display 84 and user input 86. Other types of inputs and outputs can be included in hand held device 80. Preferably, the hand held device 80 is battery operated and can be carried into the field by an operator for communication with field device 60. Information from the field device 60, or from other sources, is displayed on display 84 and the hand held device is controlled using input 86. Commands or other information can be transmitted by the hand held device 80 to field device 60.

In one configuration, the wireless communication circuitry requires power which is within the power constraints available in the field device. For example, one display currently used within field devices uses 3.6 volts at 0.5 mA. If a transmitter which is capable of operating an LCD meter is employed, the wireless communication circuitry can replace the LCD meter and use the same power source that is used to drive the LCD meter. In another example, the wireless communication circuitry is powered directly from the process control loop, for example using the voltage developed across a diode drop connected in series with the process control loop. In embodiments in which no battery is used with the communication circuitry, the circuitry can more easily meet intrinsic safety or other safety approval requirements and provide an indefinite field life without battery replacement or maintenance. In configurations in which the wireless configuration is only for sending information, power requirements can be reduced. In another example, if a greater transmission range is desired, a stationary, device such as display 32 as illustrated in FIG. 1 can include an RF repeater for re-transmission of data received from, or sent to, a field device. The RF repeater can be loop powered, or can derive its power from other sources. Further, once the RF data is received, it can be reformatted for transmission over other medium, for example an Ethernet connection, into existing data transmission structures used within process control systems, over an extended range RF communication link such as a cell phone, or relaying using another technique.

Figure 4:
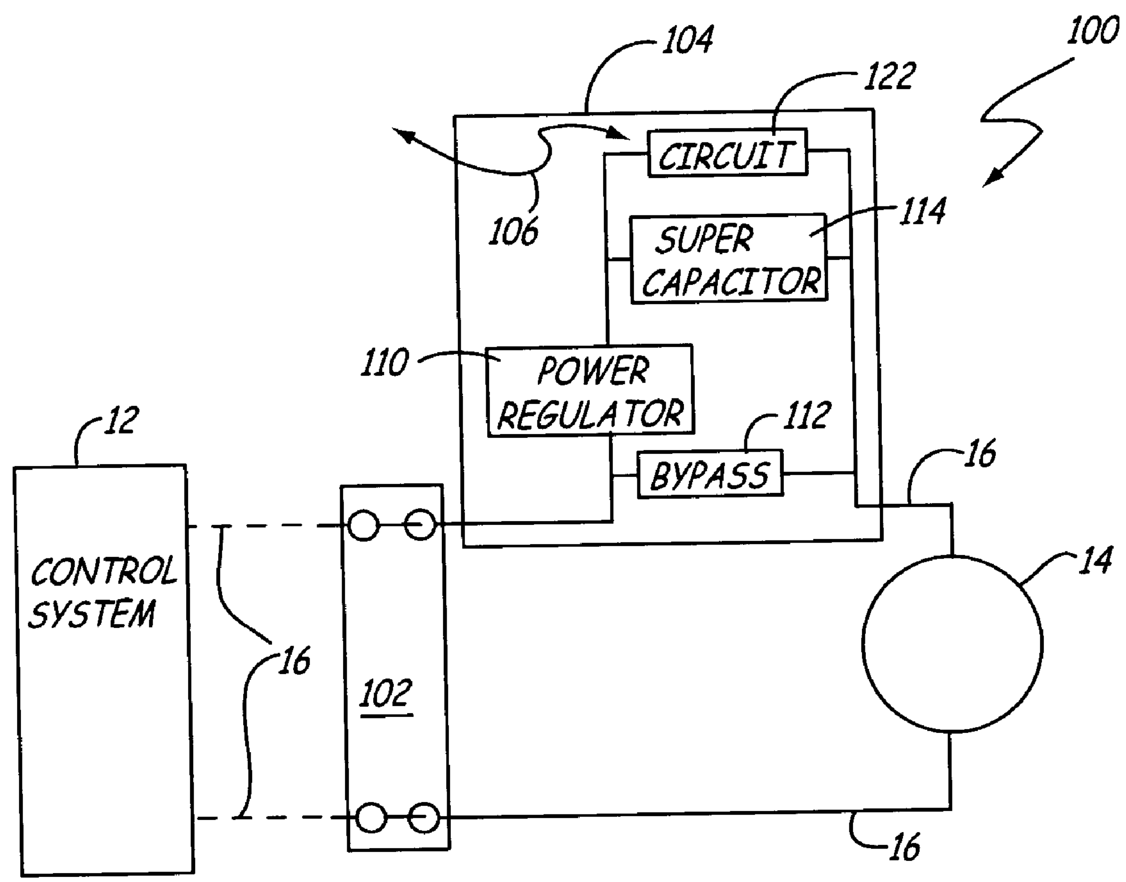
FIG. 4 is a diagram of a process controller monitoring system which includes a field device for wireless communication which scavenges power from the process control loop.

FIG. 4 is a simplified diagram of a process controller or monitoring system 100 which illustrates another aspect of the present invention. In system 100, a field device 14 connects to a control system 12 through process control loop 16 through junction box 102. In the embodiment of FIG. 4, a field device 104 couples to the process control loop 16 and includes wireless communication circuitry 122. The wireless communication circuitry 122 is configured to send an RF signal 106 and to be completely powered by power received from the process control loop 16.

Process device 104 includes a power regulator 110, a shunt or bypass 112, and a super capacitor 114. During operation, the super capacitor 114 is slowly charged (trickle charged) using a power regulator 110 by using excess voltage tapped from the process control loop 16. The bypass 112 allows loop 16 to operate normally and is connected in series with loop 16. Communication circuit 122 includes circuitry for receiving information, analog and/or digital information, carried on process control loop 16. The circuit 122 can responsively transmit an RF signal 106 based upon the received information. If operated as a receiver, circuitry 122 is capable of modulating data onto the electrical current carried in the loop 16. This can be either analog or digital information. This configuration allows data to be relayed over a wireless communication network. The network can be configured in accordance with any type of topology, including point to point, spoke and hub and mesh topologies. Process device 104 can be positioned at any location along the loop including configured as an individual device such as that illustrated in FIG. 4. In some installations, the field device 104 should be field hardened and configured for intrinsically safe operation. The device 104 can also be positioned within another field device 14, as part of a junction box 102, or even located within the control room which houses control system 12. The field device 104 can connect to more than one RF circuit 122 and/or more than one process control loop 16, either simultaneously or through the use of multiplexers or other techniques.

The use of a super capacitor allows the device to operate without internal batteries or other techniques. The use of a capacitor allows quick charging and the storage of sufficiently large energy potentials. When used in a hazardous environment, large energy storage may not be acceptable in order to meet intrinsic safety standards. However, the process device 104 can be moved away from the hazardous environment, such as at the junction box 102, where intrinsic safety is not required.

Figure 5:
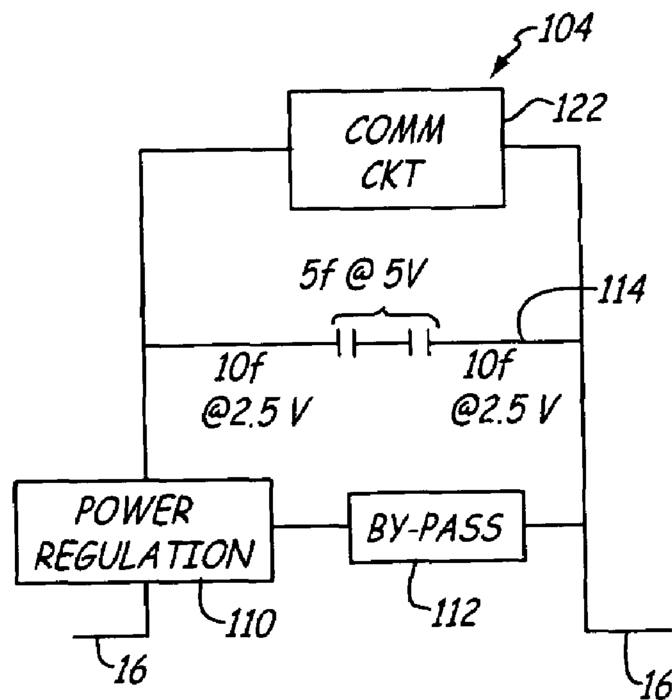
FIG. 5 is a more detailed schematic diagram of circuitry shown in FIG. 4.

FIG. 5 is a simplified schematic diagram of field device 104 showing super capacitor 114 in greater detail. In this example, super capacitor 114 comprises two 10 Farad capacitors configured to each carry a 2.5 volt potential. This yields an equivalent capacitance of 5 farads with a 5 volt potential drop. Assuming that the wireless communication circuit 122 is capable of operating at a voltage of between 4 and 5 volts, the available energy from each of the 5 Farad capacitors is $\frac{1}{2}*C(V_i^2-V_F^2)$ which is $\frac{1}{2}*5*(5^2-4^2)=22.5$ J.

Figure 6:
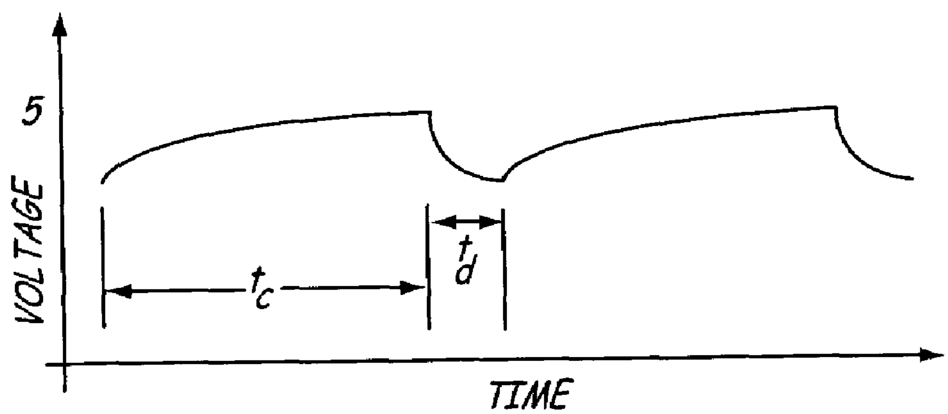
FIG. 6 is a graph of voltage versus time as measured across a capacitor shown in FIG. 5.

FIG. 6 is a graph of voltage versus time measured across super capacitor 114. In this example, 600 mW wireless transmitter which transmits a burst signal for a period of $t_d$ of 1 second will require 0.6 J/S*1 s=0.6 J of energy. Thus, there is ample energy available for operation of such a communication circuit 122.

A typical power supply used to provide power to a process control loop provides 24 volts DC. However, in a 4-20 mA system, a transmitter may only require 12 volts to operate. Wiring losses in the process control loop may cause 2 to 4 volts of voltage drop. Assuming only 5 volts is available for charging the super capacitor 114, and that the process control loop is operating at a low current level (i.e., 4 mA), there is still 20 mW available to charge the super capacitor 114. Because only 0.6 J was consumed during the transmit cycle, the available 20 mW will charge the super capacitor to full capacity in a time $t_c$=0.6 J/0.02 W=30 s. Therefore, such a configuration will be capable of transmitting a signal having a 1 second duration every 30 seconds. Assuming that the bandwidth of the communications signal is 200 Kb/s and a packet size of 200 b, the burst time is reduced to one millisecond and the resulting transmit time is 0.03 seconds. In such a configuration, diagnostic data can easily be transmitted because it is not of a time critical nature. However, if sufficiently fast charge times are available, control and process variable signals can also be transmitted wirelessly.

Although a super capacitor is described, any energy storage device can be employed including a battery, or other. The energy that is used to charge the storage device can be electrical or magnetic and can be derived or collected from any source.

Figure 7:
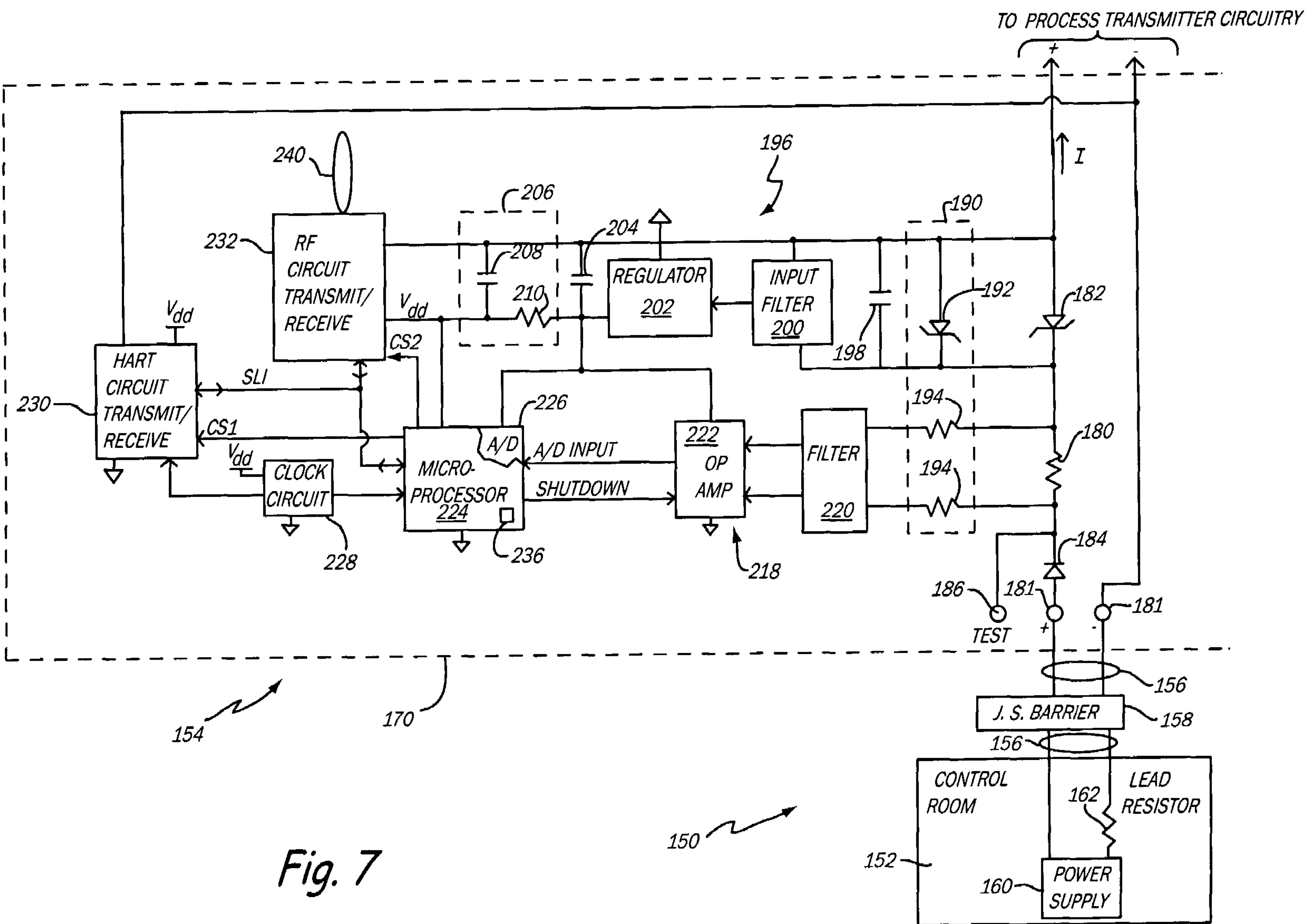
FIG. 7 is an electrical block diagram of circuitry for providing wireless communications in a process controller monitoring system.

FIG. 7 is a simplified diagram of process controller monitoring system 150 which includes a control room 152 coupled to a field device 154 through two-wire process control loop 156. Process control loop 156 extends across an intrinsic safety barrier 158. The control room 152 is modeled as including a power supply 160 and a load resistance 162.

The field device 154 can be of any configuration and is not limited to the specific schematic shown in FIG. 7. RF communication circuitry 170 is shown coupled in series with loop 156. Circuitry 170 can be implemented in a terminal block of a field device. For example, circuitry 170 can be configured as an add on module such that the two-wire process control loop 156 can connect to existing transmitter circuitry.

In the configuration illustrated in FIG. 7, the communication circuitry 170 enables wireless communication abilities to be added to a new or existing process control loop or field device. The circuitry is configured to be powered by the process control loop and can be installed anywhere in the loop ranging from the control room, anywhere along the loop itself, in the intrinsic safety (IS) barrier or junction box 158, as a stand alone field device, or included in another field device. The circuitry can be configured for any type of communication. However, in one simple configuration, the circuit 170 is configured to measure the current carried in process control loop 156 and transmit an output related to the measured current to a wireless receiver.

Turning now to one specific embodiment of circuitry 170 shown in FIG. 7, a sense resistance 180 and a power supply diode 182 couple in series with process control loop 156. The sense resistance 180 can be, for example, 10 ohms and is used in sensing the current level I carried in the process control loop 156. A test diode 184 is also coupled in series with the loop 156 and provides a test point 186. This can be used to calibrate or characteristics a field device coupled to circuitry 170. An intrinsic safety protection circuit 190 is provided which includes diode 192 connected as shown across diode 182 and isolation resistors 194 connected at opposed ends of sense resistance 180. Diode 182 is part of a power supply 196 which includes capacitor 198, input filter 200, regulator 202, capacitor 204 and secondary filter 206. Secondary filter 206 includes capacitor 208 and resistor 210. The power supply circuitry 196 generates a power supply voltage $V_{DD}$ relative to a circuit ground for use by circuitry in measuring the loop current and wirelessly transmitting a resultant signal. Although a specific power supply implementation is shown, any appropriate power supply configuration or embodiment may be used as desired.

In this embodiment, input circuitry 218 includes sense resistance 180 and is configured to measure the current I flowing through loop 156. Input circuitry 218 also includes a filter 220 which provides a differential connection to an OP amp 222. The OP amp provides an amplified input signal to an analog to digital converter 226 which is illustrated as part of a microprocessor 224. A clock circuit 228 is provided and used to provide a clock signal to, for example, microprocessor 222. Optional HART® transmit and receive circuit 230 connects to microprocessor 224, loop 156, clock circuit 228 and an RF transmit/receive circuit 232. The optional HART® circuit 230 is configured to receive a digital chip select signal (CS1) from microprocessor 224. The RF circuit 232 is configured to receive a separate digital chip select signal (CS2) from microprocessor 224. Both the HART® circuit 230 and the RF circuit 232 are configured to communicate with the microprocessor 224 on an SCI bus, depending on which chip select is active. Microprocessor 224 is also configured to provide a shut down signal to operational amplifier 222. Microprocessor 224 includes a memory 236 which is used for storing programming instructions, temporary and permanent variables and other information and may include both volatile and non-volatile memory. The memory can include, for example, an EEPROM and can contain addressing information which uniquely identifies circuitry 170. RF circuit 232 couples to an antenna 240 which can be configured as an internal antenna, external antenna, or combination, as desired. Circuitry 170 is configured to couple across the two-wire process control loop 156 such that the loop 156 can terminate at another field device such as a process transmitter or process controller.

The circuitry 170 illustrated in FIG. 7 can be implemented on a single printed circuit board such that RF antenna 240 is formed integral with the board. This configuration allows the circuitry 170 to be easily implemented in existing field devices and does not require the use of an external antenna. This reduces installation complexity.

The optional HART® transmit/receive circuit 230 can be used to monitor digital signals, such as a process variable, carried on the process control loop 156. Based upon the sensed digital signal, the HART® circuitry 230 can control operation of the RF transmit/receive circuit 232 for transmission of information related to the sensed process variable, or other information. If the HART® circuitry is implemented in accordance with the complete HART® protocol and appropriate RF protocol stacks, the circuitry can implement gateway level functionality which will allow a HART® master to communication in a bi-directional manner through the RF HART® gateway device with a HART® capable field device on the process control loop 156. This allows wireless communication with a field device for monitoring, configuration, diagnostics, or exchange of other information or data.

Frequently, in process control or monitoring installations, an operator is required to physically access a field device or the process control loop in order to exchange information with the field device. This allows the operator to repair equipment and do preventive maintenance on the equipment. The wireless communication configuration set forth herein allows the operator to interrogate field devices which may be in locations which are difficult to access. Further, even in configurations in which the field devices are easily accessible, the wireless communication circuitry does not require an operator to remove covers on equipment such as transmitters or junction boxes in order to expose loop wiring for physical connection to the process control loop. This can be particularly beneficial in hazardous locations where explosive gases or vapors may be present. A digital or analog process variable can be sensed by the wireless communication circuitry and transmitted to a wireless meter or hand held device as discussed above.

During operation, circuit 170 is placed in series with the process control loop 156 where it utilizes the 4-20 mA current flowing through the loop to power itself. For field devices that employ a common electrical ground, circuitry 170 can be inserted on the high voltage side of the loop connection. This configuration allows access to other bus circuitry within the field device such as a CAN interface. The configuration includes a test connection 186 for use in measuring loop current during testing. The sense resistance 180 is preferably configured to provide an equivalent of capacitance of zero as measure at terminals 181 which connect to loop 156 in accordance with intrinsic safety standards. Circuitry 170 is configured for nominal operation at between 3 and 4 volts and the zener diode 182 along with sense resistance 180 sets this operating voltage. The excess voltage available on typical 4-20 mA current loop is sufficient to operate circuitry 170. Further, power management techniques can be employed to limit the current drawn from the loop to about 3 mA. This allows any field device connected to the process control loop to send an alarm level signal of 3.6 mA without collapsing the circuit by drawing more than the available current level.

Zener diode 182 acts as a shunt element which is placed in series with the loop 156 to develop a preregulated voltage on the input filter stage. Any portion of the loop current which is not used by circuitry 170 is shunted through zener diode 182. The input filter 200 can comprise capacitive, inductive and resistive elements and is used to isolate the loop from any noise or load fluctuation generated by circuitry 170. This also suppresses noise in the HART® extended frequency band in order to conform with HART® standards.

The voltage regulator 202 can be any appropriate voltage regulator such as, but not limited to linear or switch mode regulators and is used to supply the voltage $V_{DD}$ to the circuitry. Filter 206 is used to store energy and further decouples circuit loads from the regulator 202. The output voltage of the secondary filter 206 is allowed to sag by several hundred millivolts during circuit load changes. This allows peak current draws by the circuitry 172 to be averaged from the 4-20 mA current loop.

In this embodiment, the microprocessor 224 including A/D converter, along with the RF circuitry 232 and input circuitry 218 can be placed into a sleep mode or low power mode during periods of idle operation in order to reduce power drain. For example, at a selected interval such as every 10 seconds, an internal timer in the microprocessor can enable the measurement of the loop current by the A/D converter. The measurement circuitry is allowed to settle before the A/D conversion occurs. After the A/D conversion is completed, both the loop measurement circuitry and the A/D converter are turned off to conserve power. The microprocessor passes the measured value to the RF circuitry 232 for transmission. Upon completion of the transmission, the microprocessor and RF circuitry return to the low power mode until the next cycle. The microprocessor may even put itself to sleep temporarily to save power. Using these power management techniques, the microprocessor is able to manage overall current requirements of the circuit by staggering the load demands on the regulator stage.

Loop current measurement is achieved using the 10 ohm sense resistor 180 coupled in series with the 4-20 mA current loop 156 to measure the analog current level. The voltage developed across the sense resistor 180 is filtered to remove fluctuations due to HART® digital communications as well as any loop noise. An operational amplifier stage 222 provides further signal conditioning and the signal is passed to the A/D converter 226 of microprocessor 224.

The RF circuitry 232 can be any appropriate circuitry or configuration as desired. In one simple form, the RF circuitry 232 simply transmits a measured variable to a wireless receiver. The antenna 240 can be used to broadcast the RF signal and can be formed integral with the circuitry 170, for example in the form of traces routed around an outside edge of a circuit board. The RF circuitry 232 can, in some embodiments, include a wireless receiver such that the circuitry 232 can be configured as a transceiver. The same antenna 240 can be used for both transmission and reception if desired. A typical low powered transceiver may have a communication range of about 200 feet, however other ranges can be achieved using different power requirements, circuit sensitivity, antenna configuration, and the like. If the circuitry 170 is mounted in a metal enclosure, such as a field housing compartment of a transmitter, an RF transparent portion of the housing should be used to allow transmission and reception of signals from antenna 240. For example, as discussed above, a glass window can be used. Other example materials include any material which is sufficiently transmissive to RF signals including plastic, or other materials.

The addition of the optional HART® circuitry 230 allows the circuitry 170 to selectively listen to a HART® message on the 4-20 mA signal carried on the current loop 156. Information such as measured process variables, diagnostic information, or other information can be transmitted to a wireless receiver. Further, if the HART® circuitry 230 is configured to modulate a digital signal onto the process control loop, it can be used to remotely command or interrogate a field device coupled to the loop 156. For example, the HART® circuitry 230 can be configured to act as a secondary master on the 4-20 mA current loop. This, in conjunction with RF circuitry 232 configured as a full transceiver, enables bi-directional communication and configuration of field device from a wireless master unit, for example a hand held device 80 shown in FIG. 3.

Microprocessor 224 can also preferably be used to implement diagnostics functionality. Microprocessor 224 is configured to monitor the voltage and current characteristics of the process control loop 156, improper or problematic variations in current and voltage can be identified using diagnostic techniques and can be transmitted to a remote location, either wirelessly, or using the HART® transmission capabilities provided by circuitry 230, or by setting the current level carried on loop 156 to an alarm value or other pre-determined value.

Circuitry 170 is preferably configured to allow operation in hazardous locations and to meet the appropriate approval and specifications, such as intrinsic safety standards. For example, the intrinsic safety protection 190, along with intrinsically safety rated resistor 180 is used on the input to the circuitry 170. Using appropriate components and circuit layout, the addition of a redundant zener diode 192 in parallel with zener 182 provides a level of redundancy and limits the amount of voltage that can enter this circuit in an intrinsic safety protected system. Similarly, the sense resistor 180 can be used to limit the maximum current that can enter the circuit 170 and snub any discharge of stored energy from the circuit through its external terminals. This provides an equivalent capacitance of substantially zero. The loop measurement circuitry is further protected by two intrinsic safety rated high value resistors 194 connected between the two ends of the sense resistor 180 and the filter 220. Other circuit components can be protected from any outside energy sources by the use of potting material or the like which also prevents hazardous gases and vapors from reaching any internal storage elements and nodes in the circuitry 170. For other non-hazardous locations, intrinsic safety components may not be required.

The term "field device" as used herein can be any device which is used in a process controller monitoring system and does not necessarily require placement in the "field." The device can be located anywhere in the process control system including in a control room or control circuitry. The terminals used to connect to the process control loop refer to any electrical connection and may not comprise physical or discrete terminals. Any appropriate radio frequency communication circuitry can be used as desired as can any appropriate communication protocol, frequency or communication technique. The power supply circuitry is configured as desired and is not limited to the configurations set forth herein. In some embodiments, the field device includes an address which can be included in any RF transmissions such that the device can be identified. Similarly, such an address can be used to determine if a received signal is intended for that particular device. However, in other embodiments, no address is utilized and data is simply transmitted from the wireless communication circuitry without any addressing information. In such a configuration, if receipt of data is desired, any received data may not include addressing information. In some embodiments, this may be acceptable. In others, other addressing techniques or identification techniques can be used such as assigning a particular frequency or communication protocol to a particular device, assigning a particular time slot or period to a particular device or other techniques. Any appropriate communication protocol and/or networking technique can be employed including token-based techniques in which a token is handed off between devices to thereby allow transmission or reception for the particular device.

Although the present invention has been described with reference to preferred embodiments, workers skilled in the art will recognize that changes may be made in form and detail without departing from the spirit and scope of the invention. As used herein, Radio Frequency (RF) can comprise electro-magnetic transmissions of any frequency and is not limited to a particular group of frequencies, range of frequencies or any other limitation. Any communication protocol can be used, as desired, including IEEE 802.11b, 802.154, or other protocols, including proprietary communication protocols.

What is claimed is:

1. A field device for use in an industrial process control or monitoring system, comprising:

terminals configured to connect to a two-wire process control loop configured to carry data and to provide power;

radio frequency (RF) communication circuitry configured for radio frequency communication;

power supply circuitry configured to power the RF circuitry using power received completely from the two-wire process control loop;

an energy storage capacitor configured to store an electrical charge using power received from the two-wire process control loop;

wherein the power supply circuitry is configured to use power from the electrical charge stored on the enemy storage capacitor; and wherein the RF circuitry is configured for bi-directional communication.

2. The apparatus of claim 1 wherein the energy storage capacitor comprises a super capacitor.

3. The apparatus of claim 1 wherein the RF circuitry is configured to transmit RF data as a function of information received from the two-wire process control loop in accordance with the HART® protocol.

4. The apparatus of claim 1 including a transducer or actuator configured to interact with an industrial process.

5. The apparatus of claim 4 wherein the RF circuitry including a modular circuit board which carries the RF circuitry, the modular circuit board configured to mount in a housing of the field device.

6. The apparatus of claim 1 wherein the RF circuitry is configured for digital communication.

7. The apparatus of claim 1 wherein the RE circuitry is configured for analog communication.

8. The apparatus of claim 1 wherein the terminals are configured to couple in series with the two-wire process control loop.

9. The apparatus of claim 1 including:

an explosion proof housing configured to enclose the RE circuitry;

an integral RF transparent region in the housing configured to allow RF transmission therethrough.

10. The apparatus of claim 9 wherein the RE transparent region comprises glass.

11. The apparatus of claim 10 including an end cap configured to mount to a main housing and wherein the end cap includes the RE transparent region.

12. The apparatus of claim 1 including:

a circuit board configured to carry the RE circuitry;

an RF antenna coupled to the RF circuitry and carried on the RF circuit board.

13. The apparatus of claim 1 wherein the RF circuitry is integral with a terminal block which carries the terminals.

14. The apparatus of claim 1 wherein the RF communication circuitry is configured to transmit an RF signal related to an analog current level carried through the process loop.

15. The apparatus of claim 1 wherein the RF communication circuitry is configured to transmit an RF signal related to a digital signal carried by the process control loop.

16. The apparatus of claim 1 including a HART® module coupled to the RF communication circuitry configured to operate as a bi-directional HART® to RF gateway unit.

17. The apparatus of claim 1 wherein the RF communication circuitry is configured for periodic communication.

18. The apparatus of claim 1 wherein the RF communication circuitry is configured to transmit an RF signal related to a process variable.

19. A method for communicating in a field device for use in an industrial process control or monitoring system, comprising:

connecting to a two-wire process control loop configured to carry data and to provide power;

communicating using a radio frequency (RF) signal;

powering the RF communicating using power received completely from the two-wire process control loop storing an electrical charge in a capacitor using power received from the two-wire process control loop, and using power stored by the capacitor to power the RF communicating; and wherein the communicating comprises bi-directional communicating.

20. The method of claim 19 wherein the communicating comprises transmitting RF data as a function of information received from the two-wire process control loop in accordance with the HART® protocol.

21. The method of claim 19 wherein the communicating comprises digital communicating.

22. The method of claim 19 wherein the communicating comprises analog communicating.

23. The method of claim 19 wherein the connecting comprises connecting in series with the two-wire process control loop.

24. The method of claim 19 wherein the communicating includes bi-directional communication between the two wire loop and the RF signal.

* * * * *

UNITED STATES PATENT AND TRADEMARK OFFICE

CERTIFICATE OF CORRECTION

PATENT NO. : 7,262,693 B2
APPLICATION NO. : 10/878235
DATED : August 28, 2007
INVENTOR(S) : Karschnia et al.

It is certified that error appears in the above-identified patent and that said Letters Patent is hereby corrected as shown below:

Claim 1

Col. 11, line 29, please change “enemy” to -- energy --.

Claim 9

Col. 11, line 53, please change “RE” to -- RF --.

Claim 10

Col. 12, line 1, please change “RE” to -- RF --.

Claim 11

Col. 12, line 5, please change “RE” to -- RF --.

Claim 12

Col. 12, line 7, please change “RE” to -- RF --.

Claim 19

Col. 12, line 33 to Col. 12, line 34, please replace “loop storing” with -- loop, storing --.

Signed and Sealed this

Third Day of June, 2008

JON W. DUDAS
*Director of the United States Patent and Trademark Office*